United States Patent [19]

Whittaker

[11] Patent Number: 5,717,872

[45] Date of Patent: Feb. 10, 1998

[54] FLEXIBLE, SOFT, RANDOM-LIKE COUNTER SYSTEM FOR BUS PROTOCOL WAITING PERIODS

[75] Inventor: Bruce Ernest Whittaker, Mission Viejo, Calif.

[73] Assignee: Unisys Corporation, Blue Bell, Pa.

[21] Appl. No.: 584,644

[22] Filed: Jan. 11, 1996

[51] Int. Cl.$^6$ ...................................................... H01J 13/00
[52] U.S. Cl. ........................... 395/285; 395/306; 395/287; 395/292; 395/293; 395/298; 395/305
[58] Field of Search ...................................... 395/287, 290, 395/293, 296, 285, 298, 305, 306, 308, 551, 552, 292

[56] References Cited

U.S. PATENT DOCUMENTS

| | | |
|---|---|---|
| 4,785,394 | 11/1988 | Fischer .................................... 395/293 |
| 4,972,313 | 11/1990 | Getson, Jr. et al. ..................... 395/293 |
| 5,168,568 | 12/1992 | Thayer et al. ........................... 395/728 |
| 5,339,440 | 8/1994 | Jacobs et al. ............................ 395/293 |
| 5,418,914 | 5/1995 | Heil et al. ................................ 395/308 |
| 5,495,585 | 2/1996 | Datwyler et al. ........................ 395/293 |
| 5,528,767 | 6/1996 | Chen ........................................ 395/293 |
| 5,577,214 | 11/1996 | Bhattacharya ........................... 395/287 |

*Primary Examiner*—Ayaz R. Sheikh
*Assistant Examiner*—Raymond N. Phan
*Attorney, Agent, or Firm*—Alfred W. Kozak; Mark T. Starr; Steven R. Petersen

[57] ABSTRACT

An initiator-sending module requests bus access on a retry-basis after a "bus-error" or "receiver-not ready" situation. The bus request retry is provided with an adjustable wait delay period tailored to the specific system and provides a programmable random wait delay which also includes a minimum time delay period programmed for that specific system network.

5 Claims, 6 Drawing Sheets

FLEXIBLE, SOFT, RANDOM-LIKE COUNTER SYSTEM FOR BUS PROTOCOL WAITING PERIODS

FIELD OF THE INVENTION

This disclosure involves systems for optimizing bus protocol operations during communication between a sending module and a receiving module.

BACKGROUND OF THE INVENTION

Figure 5:
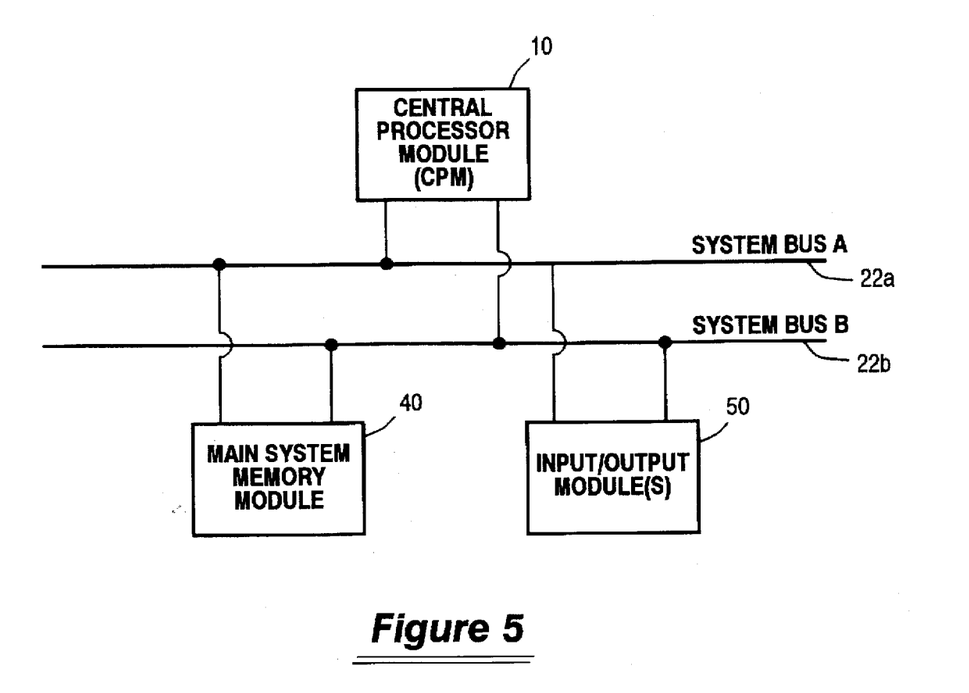
FIG. 5 is a generalized drawing of a computer network connected to dual system busses permitting sending and receiving modules to communicate with each other.

FIG. 5 shows an example of a computer network wherein the modules are connected by dual system busses. Here, a Central Processing Module 10 is connected to each of the system busses 22a and 22b. Additionally, other modules in the networks such as the main memory 40 and the Input/Output module 50 are also provided with dual connections to the dual system busses.

Figure 6:
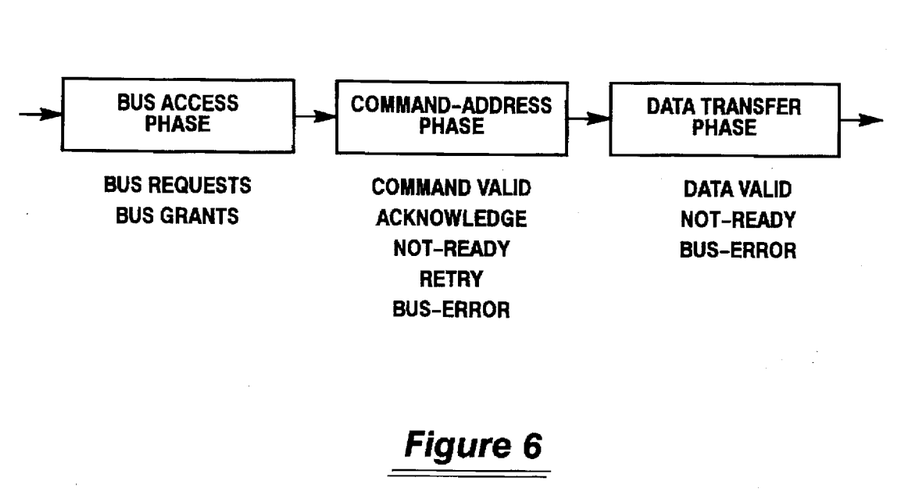
FIG. 6 is a schematic drawing showing the system bus protocol as having three general phases.

FIG. 6 is a schematic drawing indicating the operation of the system bus protocol as having three general phases, namely these involve (i) the bus access phase, (ii) the command-address phase, and (iii) the data transfer phase. The bus access phase includes the operation where an initiator asks for or requests the bus, that is to say a "bus request", and additionally, this phase includes the grant of the bus to the initiator which is designated as "bus grant", which is generally enabled by a arbitration circuit as 16a, FIG. 5. The command-address phase would include the operations of: (i) command valid determination, (ii) the acknowledge signal, (iii) a possible "not ready" signal from the receiving module, (iv) a possible retry signal from the receiving responding module back to the initiating module, and (v) a bus-error signal should an error be detected. The data transfer phase would involve: (i) the data valid operation to ensure that the data is valid, (ii) a "not-ready signal" to indicate that the responding module is not ready to respond to the initiator's request, (iii) a bus error signal to indicate that the attempted transmission on the bus involves an error condition.

Figure 4:
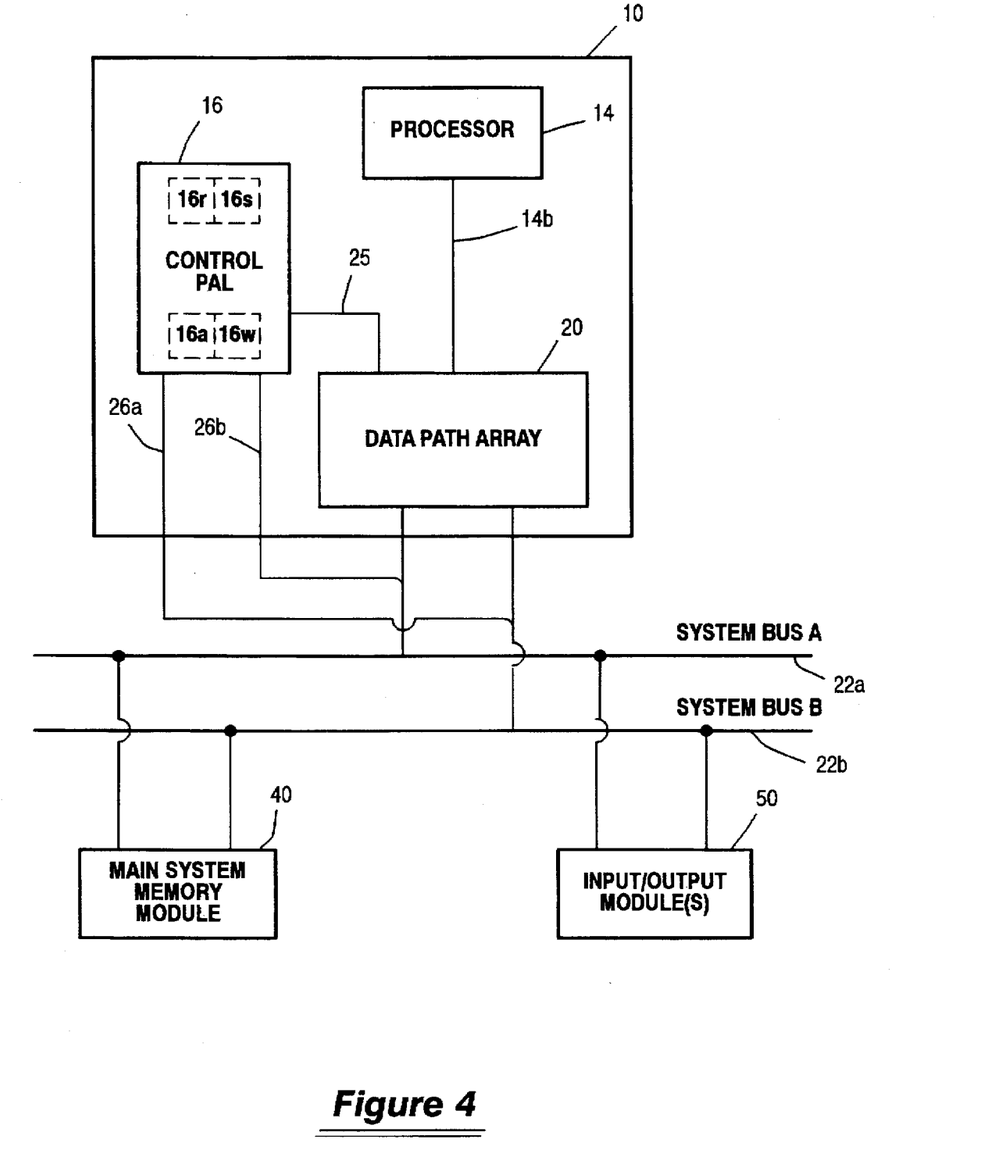
FIG. 4 is a network diagram showing the implementation for the flexible soft, random-like counter used for the bus protocol waiting periods.

For example in FIG. 4, the processor 14 could be denoted as "initiator" and could request bus access to one of the system busses 22a, 22b, in order to reach the main memory 40 which could be designated as the "responder" or receiver or "responding" module.

Thus, in the "bus access phase", a bus initiator for example, processor 14, would request access and control of a system bus 22a, 22b. A system bus arbiter (16a, FIG. 5) would operate to grant, to the initiator, one of the two busses when a bus becomes available. At this point, the initiator (processor, for example) is said to "own" the bus until it relinquishes control of the bus.

In the command-address phase, the bus owner issues a bus operation (that is to say a "command") in addition to putting an address value onto the system bus 22. During this phase, a number of important bus control signals are potentially exercised by both the bus initiator and the bus responder, that is to say, the bus module for whom the bus command is directed. These signals denote several special requirements of the bus protocol. Four of these protocol requirement possibilities are described below:

(a) RESPONDER ACKNOWLEDGE: The bus responder activates the "acknowledge" signal if everything from its perspective is a "go" for the current commanded operation.

(b) RESPONDER NOT-READY: If the responder module is momentarily unavailable, it may activate the "Not Ready" signal. This will cause time to slip, that is to say, the bus protocol "waits" while the signal is active.

(c) RESPONDER RETRY: If the responder cannot take or accept current operation at this time, it may force a "retry" situation by activating a signal called the "retry signal". In this case, the initiator must terminate the current bus operation, then release ownership of the bus, wait for a period, and then later reinstitute the operation. This situation can incur problems in the data transfer operation of these type of networks and the solutions to these types of problems is the focus of the presently disclosed system.

(d) SYSTEM BUS-ERROR: If a system bus error (for example, a "parity error") is detected on the command or the address, then any bus respondent can activate the "bus-error" signal. The bus initiator must take the same action here as it would for a "retry" case situation. Additionally, for the "bus-error" situation, a time limit counter is incremented in the general situation, which can result in an interrupt to the processor-initiator if the time limit value is reached in the counter.

Figure 2:
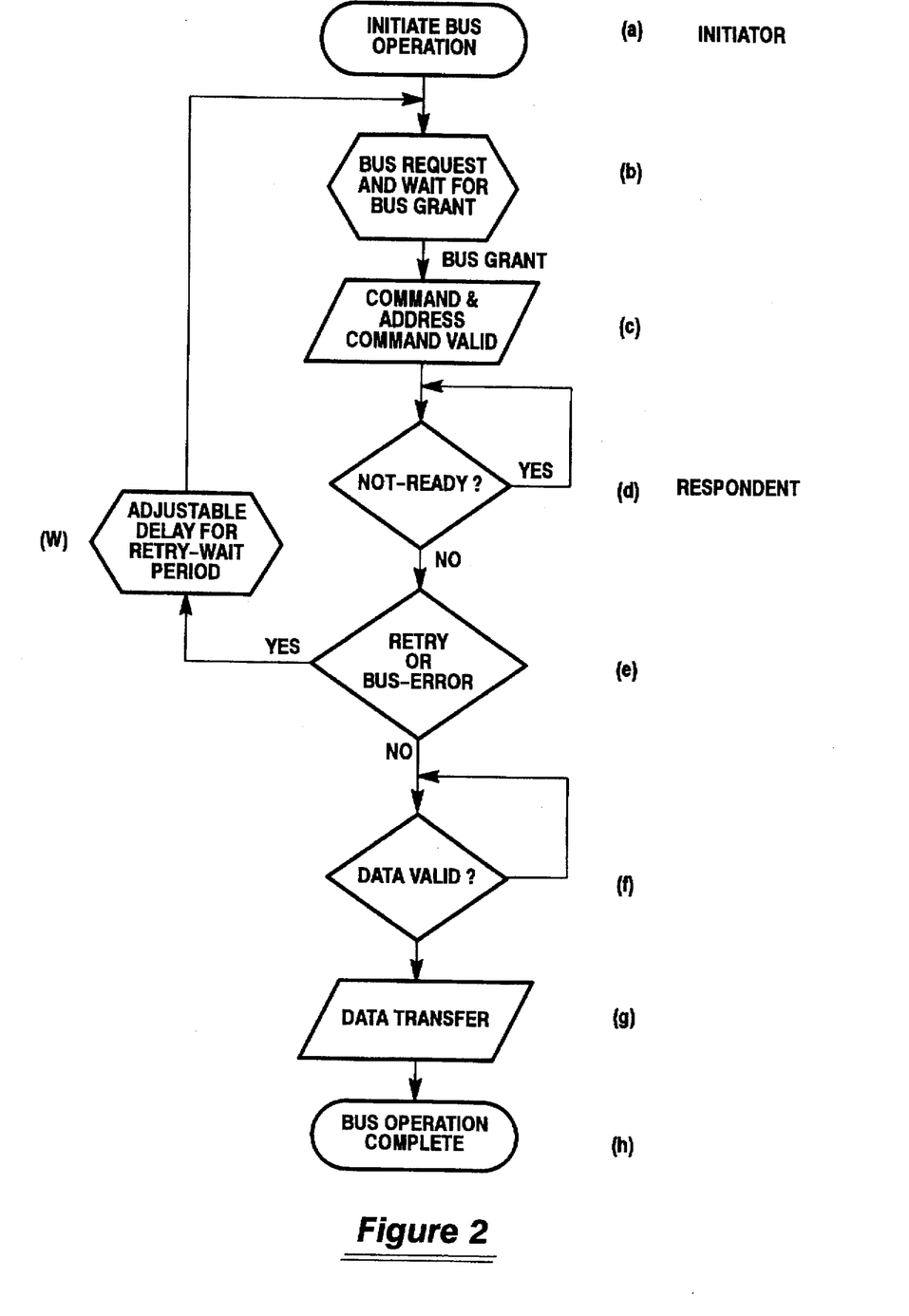
FIG. 2 is a simplified flow chart showing a general view of the system bus protocol.

In the "Data Transfer Phase" (FIG. 6) data from the initiator (if it is a Write-type operation) or from the responder (if it is Read-type operation) is transferred on the system bus 22. The "not ready" condition (b) described above, can occur here as well as a possible "bus-error" condition. These types of bus conditions, in relationship to the system protocol, are shown in FIG. 2, which indicates a simplified view of the system bus protocol in flow chart form. Thus, in FIG. 2 at (a), the initiator such as the processor 14 for example, would initiate the bus operation. Then at (b), a bus request is initiated and the initiator must wait for the "bus grant" from a bus arbiter unit. Upon allowance of the bus grant, then (c) requires that the command and the address (to the respondent) be indicated as valid.

At (d) the responding module, such as the main memory 40 or the I/O module 50, must indicate whether it is ready or not ready. If the respondent is not ready, then at (d) the protocol loops back around (Yes branch) to again ask whether the respondent is ready or not ready.

The next protocol operation is at (e) where, if a "bus error" has occurred, then the protocol must be delayed for a period at (w) and returned back to the initiate bus operation at (a). Likewise, if there is no bus error but the respondent is "not ready," then a "retry" operation must be initiated which means the protocol would revert back to position (a) of FIG. 2 through the delay period at (w). (adjustable) Since problems can arise when the status (e) occurs and cause a return to status (a), there is seen the status (w) which is a "delay" for the retry-wait period which will be seen enable an optimizing factor as discussed hereinafter.

At the status level (e), if there is no retry nor any bus error, then at (f) the protocol checks to see that the data is valid at the respondent level, after which at status (g), the data transfer occurs from the respondent back to the initiator and at (h) the protocol indicates that the bus operation has been completed.

RETRY WAIT PERIOD

Referring to FIG. 2 at the status condition (e), several possible situations might cause a bus respondent (such as the memory module 40 or the I/O module 50) to cause a "retry" condition on the system bus 22. For example, the memory module 40 might be doing a mandatory "refresh" of the dynamic memory devices. Another example, might be that a processor module's cache memory might have a "fully loaded" bus spy (bus snooping) mechanism and thus cannot take another address at the present time moment. When a "retry" occurs, it is necessary for the initiator to delay (wait)

for a period of time before re-doing (retrying) the same operation over again. In all cases, where a "retry" is asserted, the bus respondent is generally doing some higher priority activity and this activity will take some additional time. Thus, if the bus initiator does not wait for a time period before re-doing its original operation, it may simply get "retried" again. Such a multiplication of "retry" operations will be seen to waste much of the system bus throughput capacity, since some other bus module could have been using the bus resources at the time that the prior initiator was getting repeated "retry" conditions.

Thus, "waiting time" for some period is available for utilization as an optimal function to be included in the system bus protocol for all system "retry" and "bus error" conditions before re-doing the originally initiated operation again. However, several other factors with regard to the "delay/wait" (w) period also apply in this situation. It is important to wait "long enough" for the higher priority respondent's activity to be completed while at the same time waiting the shortest possible time, since the waiting period can force the waiting module (for example the processor 14) to be idle and to get no additional work done during the delay period. This would indicate that it is desirable to make the waiting period both long and also short, simultaneously, which becomes a dilemma.

Additionally, another phenomenon can occur where there are multiple initiators/responders operating on the dual bus structure. Modules tend to do many of their operations iteratively, that is to say, in repeatable loops. It is possible for a digital module to be in a fixed length looping activity at some time when there is also a simultaneous situation where some other module is initiating a system bus operation, to the Respondent module. With this type of looping situation occurring, it can often happen that the bus responder will force a system bus "retry" operation because it (the responder) is currently busy in its looping operation. Thus, then the initiator waits a period of time and then re-does (retry) the operation again, the problem arises, what if the respondent's looping operation is of the same basic time duration as the initiator's waiting time? Then it can be seen a possible kind of situation "in sync" occurs where the respondent module will force the "retry" operation, and then the initiator waits and retries the operation again and the initiator gets "retried" again. This is called a system bus "lock-up" case. In a sense, the two modules tie-up the system bus resources and simply beat on one another over and over. To prevent such "in sync" case, it is desirable that the WAIT period, at (w) of FIG. 2, be set up to be "random-like" as to its length. That is to say, arrangement should be made such that an initiator does not wait exactly that same number of clock periods each time it is forced to do a "retry" operation.

As a result, it may be indicated that there are three important requirements of the WAIT period (w) which can be summarized below:

(1) WAIT LONG PERIOD:—Wait long enough to ensure that most higher priority activities involving the respondent modules will be complete.

(2) WAIT SHORT PERIOD:—Wait as short a period as possible to minimize the waste of the bus initiator's time.

(3) WAIT RANDOM-LIKE PERIOD:—Wait a variable, random-like period of time so as to prevent the "in sync" type of modules beating against each other as described above.

The item conditions (1) and (2) above will be seen to be in direct conflict with each other. Therefore, it is important to the system performance, that a "optimum wait period" be provided in the system module design. This would then indicate that a fourth requirement for the waiting period would be:

(4) Make the "Wait Period" design as "adjustably soft" as possible.

Thus, this would allow the wait-time to be "tailored" to the actual system restraints and timing that are found to occur during system test and de-bug. This requirement would then suggest some sort of programmable device such as a PAL Programmable Array Logic-type of implementation, rather than that of a fixed, hard logic implementation.

Thus, it is the object of this invention to solve the problem of determining the "optimum wait period" (w) and to meet the criteria described above in paragraphs 1, 2, 3. It is another object of the invention to provide a soft-flexible hardware implementation which allows the final system design to be modified to use the optimal time periods found while running the system busses under real operational situations. Another object of the invention is to provide a random-like time duration that is built in a small portion of a programmable array logic device to permit flexibility to arrange the longest and shortest wait periods possible under the ongoing circumstances.

It is possible there could be designs to provide a simple counter delay in order to build up the WAIT period delay which would be a simple implementation, but this would however, provide no optimization type of adjustment without making actual hardware changes and could not provide any random-like wait periods. If such a "waitperiod" design were built into an Application-Specific Integrated Circuit (ASIC) gate array, it is possible that a pseudo-random counter could be provided but this would be lacking in flexibility. Since either a recycle design of the gate array would be required when the optimal time-wait-time-range period was discovered, or else the spare gate array pins would be tied-up to allow some sort of external changes to be made to the time periods which could be a liability to the design. These type of factors are all obviated by the presently described flexible, soft, random-like counter system for controlling the bus protocol waiting periods described herein.

SUMMARY OF THE INVENTION

A computer network having multiple digital modules all connected to each bus of dual system bus means has the situation where requests for bus access by the digital modules must be arbitrated by an arbitration logic unit. This occurs as a sending module requests bus access to communicate with a receiving module.

When a bus request is initiated by a sending module and the receiving module is not ready, the bus protocol enables the sending module to "retry" again for bus access to the receiving module. Likewise, if a bus error is detected for the data on the bus, the initiator or sending module must do a retry operation.

However, if the initiator's retry operation is initiated "too soon" before clearance of the holdup (due to not ready or bus error), then useful time is wasted on the retry operation.

The present system provides for the use of an optimum waiting period of delay before the retry operation is implemented. A programmable array logic unit (Control PAL) provides an adjustable delay for the Retry-wait period to the system bus request logic which requests access to the system bus arbitration logic.

A programmably adjustable wait-delay logic unit in the Control PAL, senses retry request or error conditions on the system busses to generate a wait-delay signal to delay the retry-bus-request which is tailored to conditions observed during system test and debug. A set of dual counters and toggle flip-flops provide the optimally minimum beyond the minimum which insures that the retry operation will have a high success rate of going to completion since the normal barriers will have been obviated by the provided wait delay period.

Referring to FIG. 4, there is seen an expanded drawing of the Central Processing Module 10 connected to the system busses 22 and external modules 40 and 50. Here, are seen the essential elements involved with system bus operations. The central processor 14 drives into a data path array interface 20 via a processor bus 14b. This is used to steer address and data information into the system busses 22a, 22b from the processor bus 14b. A programmable array logic block designated Control PAL 16 is seen with control connections to the data path array 20 via line 25 and is also connected to each of the system busses via the control lines 26a and 26b. The Control PAL 16 provides the control necessary for steering information into and out of the data path array 20, and it also provides all of the system bus protocol. The control lines 26a and 26b from the Control PAL 16 provide the data path array steering control signals. The connections 26a and 26b indicate the lines useable as "protocol controls" for the two system busses. The enhanced time control functions for the bus protocol are implemented in the Control PAL 16.

System Bus Requests and Wait Signal Operations

Figure 1:
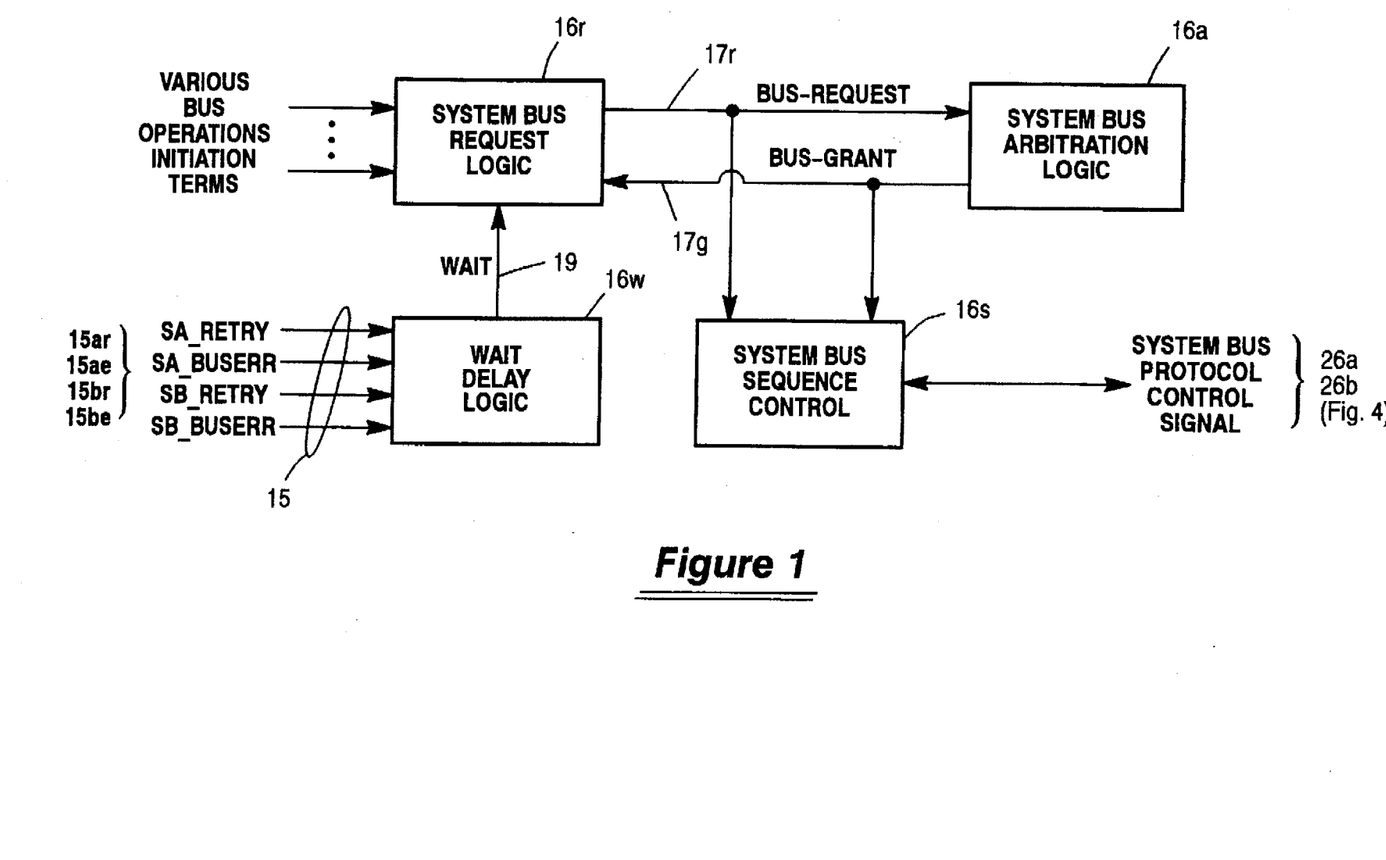
FIG. 1 is a diagram indicating the use of the wait-delay logic for adjustably delaying the bus request retry operation for the system bus protocol.

FIG. 1 shows four of the functional control blocks implemented in the programmable array logic, Control PAL of FIG. 4. These blocks include the System Bus Request Logic 16r, the System Bus Sequence Control 16s, the System Bus Arbitration Logic 16a and the Wait Delay Logic 16w. The System Bus Arbitration Logic 16a is not necessarily part of the processor module 10, but can be. This arbitration unit can be implemented somewhere in the system, either in the Central Processing Module or elsewhere. All system modules will have to share the System Bus Arbitration Logic 16a for system bus access. Described below is the function of each one of these units seen in FIG. 1.

System Bus Request Logic 16r (FIG. 1)

There are a number of possible conditions that can initiate a system bus operation. These include:

(a) Processor Read Memory Operation (Cache Miss).
(b) Processor Write Memory Operation.
(c) Processor Read Lock to Memory Operation (called Read Modify Write).
(d) Processor Send Message to Other System Modules Operation.
(e) Processor Read-Time-of-Day From I/O Module Operation.

Any of these processor actions will cause the system bus request logic 16r to seek access to a system bus by activation of the bus request signal on line 17r (FIG. 1). When either system bus is available, the arbitration logic 16a will activate the bus grant signal on line 17g back to the processor 14. At this point, the processor module 14 is considered to "own" that particular system bus.

System Bus Sequence Control 16s (FIG. 1)

This unit provides all the proper sequencing necessary for the processor module to control and utilize the system busses. This block follows all the required bus protocol disciplines which were indicated in FIGS. 2 and 6.

System Bus Arbitration Logic 16a (FIG. 1)

This logic receives the bus request signals from each of the possible system bus initiators (processor, memory, I/O modules). This logic provides BUS_GRANT signals, on line 17g, to each of these modules for each of the two system busses. Thus, this logic can grant system bus A (22a) to one module and simultaneously grant system bus B (22b) to another module.

Wait Delay Logic 16w (FIG. 1)

This logic block is the focal point for the flexible, soft, random-like system for the bus protocol waiting periods. The wait delay logic 16w resides within the programmable array logic of the Control PAL 16 (FIG. 4), which is situated on the Central Processing Module. This block monitors two system signals from each of the two system busses as seen in FIG. 1. These signals are the RETRY for bus A (15ar), RETRY for bus B(15br), and the bus error signals BUSERR for bus A (15ae) and B (15be). These are also designated in FIG. 1 as SA_RETRY and SB_RETRY, SA_BUSERR and SB_BUSERR.

If either of these input line signal conditions occur in bus 15 while the processor 14 is the "initiator" on that system bus, then the Wait delay logic 16w is triggered. This block will provide for a period of time, to be enumerated later, to develop a WAIT signal on line 19, FIG. 1. This signal inhibits the SYSTEM BUS REQUEST LOGIC 16r from re-issuing its BUS_REQUEST signal on line 17r. The functional effect of this action is to cause the system bus module namely, the processor 14, to delay re-doing any "RETRYed" or "BUS ERRORed" system operations for this particular "WAIT" period of time. This adjustable wait operation provides the saving grace for any wasted time or lock-up situations in the system.

The logical equation for the BUS_REQUEST signal 17r in its simplified form is shown below in Table I to show the effect of the WAIT signal on line 19, of FIG. 1.

TABLE I

BUS_REQUEST=WAITFF/*WRITE-OPERATION-
REQUEST*BUS_GRANTs/
   + WAITFF/*READ-OPERATION-REQUEST*BUS_GRANTs/
   + WAITFF/* . . .

+ = OR operation
* = AND operation
/ = inversion

Figure 3:
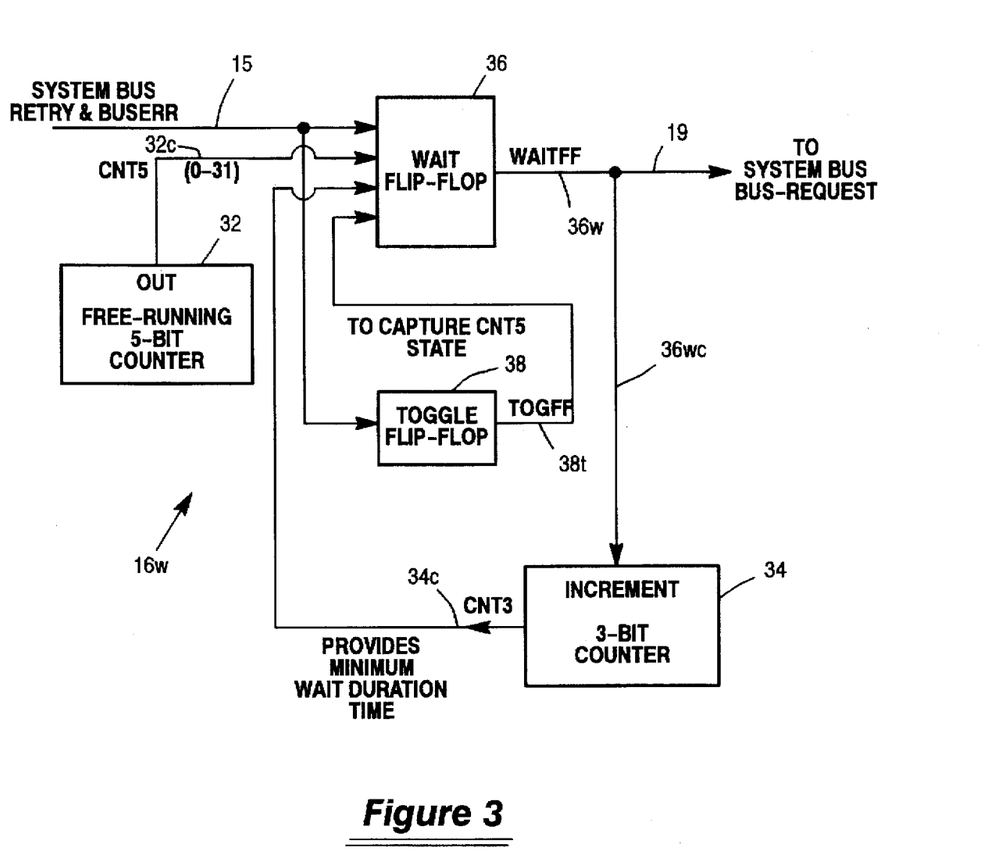
FIG. 3 is a drawing of the programmable array logic functional units showing the wait flip-flops and counter units.

Wait Logic Implementation (FIG. 3)

As was previously indicated, the four design criteria which were placed upon the "Wait Period" logic were: (i) wait a long enough period while still waiting the shortest possible; (ii) wait a random-like period; (iii) implement the design for adjustability in some soft-flexible hardware for easy system adaptation.

The Wait Period logic for this implemented system is done totally in a soft "flex" programmable array device such as the Intel part iFX 780. This wait delay logic 16w uses only five of possible eighty macrocell portions available in one of these flex devices. This constitutes only about six percent of the hardware resources in one of these devices which is a very small cost to bear for the soft-reprogramability possible that the design provides and which is useful even in the field.

Referring to FIG. 3, the logic design of the Wait-Delay period system is seen composed of several units. These include a free-running counter 32, a three-bit counter 34, a wait flip-flop 36 and a toggle unit flip-flop 38. Each of these items provide a certain functionality to the Wait-Delay circuitry as indicated hereinbelow.

Free Running Counter (32) (FIG. 3)

This unit was often a pre-existing unit in the processor logic. It involved a five-bit free running counter which counts every system clock time. This type of counter was already used in other types of processor logic such as system time-out detection. Thus, in a sense this block came to be usable totally free without any additives. This logic has a free-running nature which is that of always being ongoing regardless of what else is happening and it also provides part of the "random-likeness" required of the Wait Period. Further, its count duration is 32 possible clock times with the use of the 5-bits, and this provides the Wait Period delay duration parameter.

Three-Bit Counter (34) (FIG. 3)

This counter is basically a 3-bit binary up-counter. It has a value of zero until the signal WAITFF is activated on lines 36w and 36wc. While this signal is "on", counter will increment on each clock time. Thus, this counter will provide the range for the "minimum" Wait Period requirement.

Toggle Flip-Flop 38 (FIG. 3)

This is a 1-bit flip-flop which operates to be either "on" (=1) or "off" (=0). This flip-flop is toggled from 1 to zero or from zero to 1 each time that the WAITFF signal is first turned "on". The toggle flip-flop 38 provides an additional aspect of the "random-likeness" feature of the Wait Period logic.

Wait Flip-Flop (36) (FIG. 3)

This flip-flop provides the actual delay via line 19 to the Bus Request Logic 16r of FIG. 1. This flip-flop is set when a system bus "Retry" or a "Bus Error" condition is detected, via lines 15. It will remain on for the duration of the Wait Period itself.

In FIG. 3, the free-running counter 32 was a logic block that preexisted in the "flex" programmable array logic where the Wait Period logic was implemented. This counter 32 is a 5-bit binary up-counter. It is always running and counting at the system bus clock rate. The five bits of the counter are denoted as CNT5n, where "n" equals 4, 3, 2, 1, 0 (where 4 is the most significant). Since CNT5 is free-running, at any given moment there is an "equal probability" that any one of the possible 32 binary counts is the current state of CNT5.

System bus operations are initiated by the processor 14 of FIG. 4. The processor 14 operates at a much higher frequency than does the system bus 22. Thus, the processor and the system bus clocks are also asynchronous to each other. Therefore, whenever a processor initiated system bus operation occurs, the value of CNT5 on line 32c can be anything from zero to 31. There is no predictability of the state of the line 32c (CNT5) when the processor is doing a system bus operation. Thus, from the processor's perspective, the state of CNT5 is "random" by definition.

If a Wait Period condition occurs for a given processor system bus operation, then the "state" of CNT5 (which is random) is captured and is then used to help determine the duration of the said Wait Period.

In FIG. 3, the toggle flip-flop 38 is used to further increase the "random-likeness" of the Wait Period duration. The output line 38t, TOGFF is toggled (from zero to 1, or from 1 to zero) each time that a wait period is started. Thus, on one wait period, the TOGFF is, for example, equal to zero, then for the next wait period, TOGFF is equal to one, then for the next TOGFF is equal to zero, and so on. The signal TOGFF on line 38t is used to "capture" different count states CNT5, depending on whether TOGFF is a zero or a 1 value. These CNT5 states are denoted as: STOP0_CNT5 and STOP1_CNT5, respectively. Thus, the "random" CNT5 state is further "randomized" by the use of the toggle flip-flop 38.

It may be noted that further flexibility (softness) is found in this situation. When actual system testing has given a proper, optimal range for the system wait periods, then the flexible programmable array logic PAL 16 can be programmed such that several CNT5 (line 32c) count values are included in each one of the above STOPx_CNT5 values. This will allow the termination of the Wait Period to be programmed to a lesser value than the maximum of 30 clocks if the entire 32 states of CNT5 are used.

In FIG. 3, the 3-bit counter 34 is a simple 3-bit binary up-counter. It is used to provide an output denoted as CNT3n on line 34c, where n=2, 1, 0 (where 2 is the most significant). A normal state of CNT3 is the "zero" state whenever a Wait Period is started, then CNT3 on line 34c begins to increment at the "system bus" clock rate. This unit has eight possible count states. The signal CNT3 provides the "minimum" duration time of the Wait Period. CNT3 must count up to a "terminal count value", STOP_CNT3, before the random CNT5 counter 32 can be used to end the wait period. The choice of which of the eight possible states of CNT3 is used for the STOP_CNT3 value is part of the flexible, soft, features of this system. This value can be selected and programmed into the programmable array logic 16 (FIG. 4) after sufficient actual system testing has been done to determine the optimal minimum duration for the Wait Periods. The minimum durations can range from one up to eight possible system bus clock periods depending upon what state of CNT3 is programmed for the STOP_CNT3 value. Table II indicates the values involved.

TABLE II

| Set of Possible "Minimum" Duration Periods | |
|---|---|
| CNT3 value | WAIT duration System Bus Clock Periods |
| 000 | 1 |
| 001 | 2 |
| 010 | 3 |
| 011 | 4 |
| 100 | 5 |
| 101 | 6 |
| 110 | 7 |
| 111 | 8 |

Wait Flip-Flop (36) (FIG. 3)

The Wait Flip-Flop 36 has an output signal on line 36w shown as WAITFF. This flip-flop is the chief actor in creating the optimally proper Wait Period. The signal WAITFF is set to a "1" value when any of the four possible wait period initiation conditions occur on lines 15 of FIG. 1. These conditions involve the "Retry" and the "Bus Error" signals from the two system busses 22a and 22b. When the signal WAITFF is "on", it inhibits further system bus accesses for this particular processor module. When WAITFF is "off" then the normal processor system access requests are enabled. Table III below shows the set and reset conditions for the WAITFF signal.

Once "on", the signal WAITFF causes the 3-bit counter 34 to increment, via line 36wc. Once the proper CNT3 termination count, STOP_CNT3, is reached, it then becomes possible to reset (turn-off) the signal WAITFF. At this point, the random-termination value from CNT5, line 32c, is selected by the current state of the toggle flip-flop line 38t, TOGFF. This can take from zero up to 32 clock times from this point to reach the selected stop value, STOPx_CNT5. Since the state of CNT5 is totally unpredictable and indeterminate from the processor perspective, then once the signal WAITFF on line 36w reaches its possible termination point, any value might exist at that instant for CNT5 on line 32c. Therefore, the signal STOPx_CNT5 may be available immediately or may be anywhere from zero to 32 clock times away. Once the final stop value STOPx_CNT5, does actually occur, then the signal WAITFF is reset to the "zero" state. At this point, the Wait Period is over and the normal system bus accesses can begin again.

Wait Period Duration

From the above description, it can be seen that the minimum Wait Period duration is one clock time. The maximum Wait Period duration is 40 clock times. Further, the Wait Period can randomly take on any value between the programmed minimum time (from 1 to 8 clock times) and the maximum value of 40 clock times. If it is assumed that it is found desirable that the minimum system bus Wait Period be at least 8 clock times, and therefore, the STOP_CNT3 value will have programmed to a value of CNT3= "111" (binary). If it is assumed that a particular system (such as the Unisys A-11 computer) has a usage of the CNT5 values utilized for the STOPx_CNT5, then the wait period duration will range from a minimum of 8 clock times up to a maximum of 40 clock times. Between these 8 and 40 clock times, the duration will be "random" values. Thus, this range will meet all the requirements posed in the previous discussion.

Wait Period Logic Equations

The following Table III shows the specific logic equations that implement the Wait Period in the soft "flex" programmble array logic device 16 (Control PAL) of FIG. 4.

TABLE III

| TERM | EQUATION |
| --- | --- |
| Increment_CNT3 | WAITFF |
| Set_WAITFF | SA_RETRY+SA_BUSERR+SB_RETRY +SB_BUSERR |
| Reset_WAITFF | STOP_CNT3*STOP0_CNT5 + STOP_CNT3*STOP1_CNT5 |
| TOGFF | (toggle) Set_WAITFF |
| STOP_CNT3 | CNT32*CNT31*CNT30 (soft, any combination available) |
| STOP0_CNTF5 | TOGFF/*CNT54/*CNT53/*CNT52* CNT51*CNT50 (soft, any combination available) |
| STOP1_CNT5 | TOGFF*CNT54*CNT53*CNT52* CNT51/*CNT50/ (soft, any combination available) |

* = AND operator
+ = OR operator
/ = (inversion) NOT

Thus, in a computer network such as shown in FIG. 4 in simplified form, there may occur systems attached to dual system busses which have two processor modules and two or more input/output modules in addition to the memory module all of which are driving information onto the two busses or receiving information from the two system busses. The two system busses are identical and of equal priority. Any one of the modules which is seeking access to a system bus may eventually utilize either one of the busses with equal probability. Further, certain modules may be sending and receiving on both busses simultaneously.

In networks having up to four possible bus initiators, such as two processors and two I/O modules, and with up to five possible responder modules such as processors, I/O modules and memory modules, the potential bus activity and traffic is rather extensive. Thus, properly designed bus protocols and rigid adherence to the protocol by all modules is imperative for optimal system operations.

As previously discussed in such networks, the problem arises in regard to the amount of delay allocatable for a Retry-Wait Period as shown in FIG. 2 at status level (w). The problems presented in determining the optimal amount of wait period is provided by this system in a simple and inexpensive manner of implementation. It utilizes only about 6% of an already existing "flexible" programmable array device (Control PAL) located in the central processor module. Further, these programmable array logic devices are totally field programmable on the card. Thus, the "Wait Period" parameters can now be optimized to the ideal system operational levels and implemented almost virtually free by using the existing hardware in most systems.

Described herein as been an implementation for a flexible, soft-random-like counter system for establishing bus protocol waiting periods in an optimal fashion. One specific workable implementation of this system has been shown and illustrated, however, other similar systems may also be possible with the use of the concepts developed in this invention which is defined in the attached claims.

What is claimed is:

1. A system wherein multiple requesting modules can request access to busses of a dual system bus means and which provides an adjustably programmable delay period in requesting subsequent bus access by a first initiating requesting module having a prior incomplete bus access request on retry operations comprising:

(a) arbitration logic means for receiving bus access requests from requesting modules and for granting bus access to said requests;
   (b) wait-delay logic means for setting a delay period for delaying a subsequent request for bus access by said first initiating requesting module, to said arbitration logic means, on retry operations, according to parameters derived from system debug and testing for each particular computer network, said parameters being utilized by said wait-delay logic means which includes:
   (b1) means to set the minimum value of said delay period;
   (b2) means to establish a random count delay time equal or greater than said minimum value for extending said delay period based on said each particular computer network.

2. The system of claim 1 wherein said wait-delay logic means includes:

(a) WAIT flip-flop means for providing said minimum value of said delay period to said arbitration logic means;
   (b) a first counter means providing sequential counts of 0–31 system bus clock periods to said WAIT flip-flop means;

(c) second programmable counter means providing sequential counts of from one to eight system clock periods for setting the minimum value of wait time to said WAIT flip-flop means;

(d) toggle means operating on an on-off cycle to capture a random count from said first counter means.

3. In a computer network having first and second requesting modules and utilizing dual system bus means for connecting a central processor, via a data path array, with a main memory module and I/O module, a system for optimizing wait time of a retry operation of a first initiating requesting module having a prior incomplete bus access request, for a bus access to either bus of said dual system bus means, said optimizing said wait time of said retry operation involving a insertion of a programmable wait delay means to establish a wait delay period (W) between said prior incomplete bus access request and said next bus access request, said system comprising:

(a) a first initiating requesting module requesting said next bus access request, to a system bus arbitration logic unit, of bus access after a prior incomplete bus request cycle by said first initiating requesting module;

(b) said system bus arbitration logic unit for selecting when said first initiating requesting module will be granted next bus access after not completing its prior bus access request;

(c) said programmable wait-delay means for establishing a delay-period W between said prior bus request and said next-retry bus request to said arbitration logic unit, including:

(c1) means to set said delay period W to an optimal value which is programmable so as to provide said value as a selected random count from a free running counter wherein said selected random count is equal is greater than a minimum value Wm, designated as the minimum wait time, in system bus cycles, to allow completion of bus requests by said second module requesting bus access, and said random count operating to prevent said first and second modules from making requests for access in synchronism which would ordinarily block each other from bus access;

(c2) said wait-delay period W, and said minimum value, Wm, being derived from system test and debug operations for each particular computer network.

4. The system of claim 3 wherein said programmable wait-delay means includes:

(a) said free running counter for sequentially counting 0–31 system clock period and providing random count numbers to a Wait Flip-Flop;

(b) a 3-bit counter settable to provide one of eight possible count outputs from 1–8 for establishing said minimum wait time, Wm, for said Wait Flip-Flop;

(c) a toggle Flip-Flop for cycling on-off signals to said Wait Flip-Flop;

(d) said Wait Flip-Flop for setting said delay period W before activating said bus arbitration logic for bus access retry operations which optimizes utilization of said-dual system bus means from lockup and wasteful recycling of the retry operation.

5. A method in a computer network, having multiple digital modules which seek access to a dual system bus means, for setting time period delay for access to said dual system bus means on a subsequent retry operation after a first initiating requesting module did not complete its prior bus access request, said time period delay, being defined as that programmable time period which will prevent two simultaneously access-requesting modules from locking each other out from bus access while also providing the shortest delay period between said prior and subsequent access requests which will allow availability of bus access to said first initiating requesting module after other requesting modules are no longer using said dual system bus means, said method comprising the steps of:

(a) testing the network to determine the said shortest delay period to delay successive retry operations for said first initiating requesting module seeking subsequent bus access from a bus arbitration logic means;

(b) programming a counting means to select a random number count from a sequence of 0–31 system bus clock periods to establish a delay period before said bus arbitration logic means can grant a subsequent retry bus access grant to said first initiating requesting module, said random number count always being greater than said shortest delay period.

* * * * *